(12) United States Patent
Schmidt (10) Patent No.: US 7,322,782 B2
(45) Date of Patent: Jan. 29, 2008

(54) DEVICE FOR FIXING AND/OR POSITIONING OBJECTS IN A TRANSPORT CONTAINER

(76) Inventor: Ernst Schmidt, Adolf-Lins-Strasse 1, 34628 Willingshausen (DE)

( * ) Notice: Subject to any disclaimer, the term of this patent is extended or adjusted under 35 U.S.C. 154(b) by 0 days.

(21) Appl. No.: 10/958,488

(22) Filed: Oct. 5, 2004

(65) Prior Publication Data

US 2005/0087535 A1    Apr. 28, 2005

(30) Foreign Application Priority Data

Oct. 9, 2003   (DE) ................. 203 15 865
Aug. 9, 2004   (DE) ................. 20 2004 012 593 U (51) Int. Cl.
   *B60P 7/14*    (2006.01)
(52) U.S. Cl. ..................................... 410/127
(58) Field of Classification Search ............... 410/127, 410/31, 32, 34, 38, 42, 121, 122, 123, 124, 410/126, 128, 129, 130, 131, 132, 142
   See application file for complete search history.

(56) References Cited

U.S. PATENT DOCUMENTS

| | | | | |
|---|---|---|---|---|
| 1,405,485 | A | * | 2/1922 | Callery ................. 410/127 |
| 1,517,100 | A | * | 11/1924 | Bacon .................. 410/126 |
| 1,616,012 | A | * | 2/1927 | Walsh ................... 410/31 |
| 1,813,269 | A | * | 7/1931 | Barrett ................. 410/127 |
| 2,295,609 | A | * | 9/1942 | Shimon ............... 220/592.14 |
| 2,885,221 | A | * | 5/1959 | Weeks .................. 410/128 |
| 3,344,750 | A | * | 10/1967 | Kostrewa .............. 410/127 |
| 3,345,955 | A | * | 10/1967 | Erickson .............. 410/127 |
| 3,472,180 | A | * | 10/1969 | Loomis ................ 410/127 |
| 3,499,395 | A | * | 3/1970 | Verde .................. 410/127 |
| 3,559,591 | A | * | 2/1971 | Breen et al. ........... 410/127 |
| 3,590,746 | A | * | 7/1971 | Gibson ................. 410/127 |
| 3,606,842 | A | * | 9/1971 | Verbick ................ 410/94 |
| 3,754,516 | A | * | 8/1973 | Van Gompel .......... 410/47 |
| 3,791,311 | A | | 2/1974 | Loomis |
| 4,052,083 | A | * | 10/1977 | Lutz .................... 410/122 |
| 4,498,824 | A | * | 2/1985 | Kinkle ................. 410/121 |
| 4,815,905 | A | * | 3/1989 | Garcia, Jr. ............ 410/128 |
| 5,011,350 | A | * | 4/1991 | Brock .................. 410/128 |

(Continued)

FOREIGN PATENT DOCUMENTS

DE        32 29 785        2/1983

(Continued)

*Primary Examiner*—H Gutman
(74) *Attorney, Agent, or Firm*—Michael J. Striker (57) ABSTRACT

A device for fixing and/or positioning objects (6) in a transport container (1) has a first and a second structural part (7, 8). One of the structural parts (7) is configured as an assembly element and another of the structural parts (8) is configured as a holding element. At least one swivel mechanism (9, 15) connects the two structural parts (7, 8) and has two legs pivotally connected to one another. One leg is adjustably disposed for the creation of selected positions of the two structural parts (7, 8) relative to one another. A mechanism for locking the structural parts (7, 8) in the creatable relative positions is provided. The swivel mechanism (9, 15) is Y-shaped and has a long leg (10, 16) connected to both structural parts (7, 8) and also a short leg (11, 17) connected to one of the structural parts (7, 8) and a central region of the long leg (10, 16).

19 Claims, 9 Drawing Sheets

U.S. PATENT DOCUMENTS 5,839,865 A  11/1998  Schmidt
5,855,459 A *  1/1999  Krier et al. ................. 410/155

FOREIGN PATENT DOCUMENTS

EP  0 737 601 A1  10/1996
GB  1 451 117  9/1976
SU  914 354  3/1982

* cited by examiner

DEVICE FOR FIXING AND/OR POSITIONING OBJECTS IN A TRANSPORT CONTAINER

CROSS-REFERENCE

The invention described and claimed hereinbelow is also described DE 203 15 865.2. filed Oct. 9, 2003 and DE 20 2004 012 593.5. filed Aug 9, 2004. These German Patent Applications, whose subject matter is incorporated here by reference, provide the basis for a claim of priority of invention under 35 U.S.C. 119(a)-(d).

FIELD OF THE INVENTION

The invention relates to a device for fixing and/or positioning objects in a transport container, comprising: a first and a second structural part, wherein one of the structural parts is configured as an assembly element to be fastened on the transport container and another of the structural parts is configured as a holding element intended for abutment against the objects, at least one swivel mechanism connecting the two structural parts and having two legs pivotally connected to one another, of which one is adjustably disposed for the creation of selected positions of the two structural parts relative to one another on one of the two structural parts, and a means for locking the structural parts in the creatable relative positions. The invention further relates to a transport container fitted with such a device.

BACKGROUND OF THE INVENTION

In cargo planes, railway goods wagons, cargo containers, lorries or similar, the problem frequently arises of objects placed on the loading surface of a transport container unintentionally slipping back and forth because of a lack of usable fastenings during braking and accelerating manoeuvres or travel around bends. This can not only cause damage to the objects, but, particularly when transporting heavy, sharp-edged objects, can also cause damage to the structure or bodywork parts of the vehicles or cargo containers.

Therefore, devices of the aforementioned type are already known (GB-A-14 51 117), which have two structural parts that are panel-shaped, for example, and are displaceable relative to one another, one of which being configured as an assembly element and fastened to a wall of the transport container. The other structural part is configured as a clamping or holding element and when not in use is arranged in the vicinity of the assembly element so that there remains a sufficiently large free space between it and an opposing wall of the transport container to receive the objects. If the load is to be secured or positioned in the region of a wall, the holding element is moved against the objects in such a manner that these are firmly clamped between the holding element and the opposing wall or are at least positioned in an area, which is then formed between the pushed-forward holding element and the opposing wall.

A swivel mechanism, which is arranged between the two structural parts and fastened to these and which is operated by means of a threaded rod arranged perpendicular to the direction of movement, serves to perform the movements of the holding element, and by self-locking at the same time serves as a means for locking the holding element in a preselected clamping position. A disadvantage in this case is firstly that the device has a comparatively complicated structure, and secondly access to the threaded spindle becomes more difficult in the case of transport containers with high upward projecting side walls and in the case of confined space conditions, as is the case, for example, with smaller transport containers such as standard crates, for example.

In addition, devices of the aforementioned type are known (EP-A-0 737 601), in which the two structural parts can be moved relatively to one another by means of a swivel mechanism, which has a plurality of levers connected to one another in a scissor-like arrangement. The end sections of the levers are displaceably disposed by means of slide sections in guide means arranged transversely to the direction of movement. Moreover, the swivel mechanism has an associated means for locking the holding element in a preselected position that contains a locking screw or a clamping element. This known device is especially intended for the luggage areas of passenger vehicles and is also usable in the case of confined space conditions, since, in contrast to the device described, it can be operated from a front or rear wall of the transport container. However, the disadvantage with this device is that it is not sufficiently stable and torsionally rigid, when heavy objects weighing 200 kg and more, for example, have to be fixed in position.

Moreover, what the two known devices have in common is that their two panel-shaped structural parts are arranged essentially parallel to one another and to two associated walls of the transport container in each relative position. This results in problems with the fixture and positioning of objects, which only extend over a portion of the width of the respective transport container and/or have round or cylindrical outer contours such as barrels, for example.

SUMMARY OF THE INVENTION

It is therfore, an object of the present invention to configure the device above specified so that it is structurally simple and easy to manufacture.

A further object is to so design the device specified above in such a manner that it is structurally simple but still stable and torsionally rigid.

Yet another object of this invention is to make the device mentioned above suitable particularly for application in fully closed transport containers such as crates, for example, or similar.

A further object of the present invention is to provide the device above specified with a swivel mechanism, which also allows, at least to a limited extent, the two structural parts to be arranged on an incline relative to one another, where required.

These and other objects are solved in accordance with the present invention by a device which is characterised in that the swivel mechanism is Y-shaped and has a long leg connected to both structural parts and also a short leg connected to one of the structural parts and a central region of the long leg.

The invention is further characterized by a transport container which is provided with such a device.

The advantage of the invention is that the Y-shaped configuration of the swivel mechanism allows the device to be configured in manner that is a structurally simple, while still being stable and torsionally rigid. In this case, positions other than merely mutually parallel positions can be created for the two structural parts. Moreover, in keeping with the required stability and torsional rigidity, the different legs of the swivel mechanism can also be configured either as simple weight-saving rods, or also as reinforcing, frame- or panel-shaped elements. The same advantages can be achieved if, in a further development of the invention, the two structural elements are provided with two or more Y-shaped swivel mechanisms, which are preferably arranged one on top of the other or next to one another.

Further advantageous features of the invention may be seen from the dependent claims.

BRIEF DESCRIPTION OF THE DRAWINGS

The invention is explained in more detail below on the basis of embodiments in association with the attached drawings, wherein.

DETAILED DESCRIPTION OF A PREFERRED EMBODIMENT OF THE INVENTION

Figure 1:
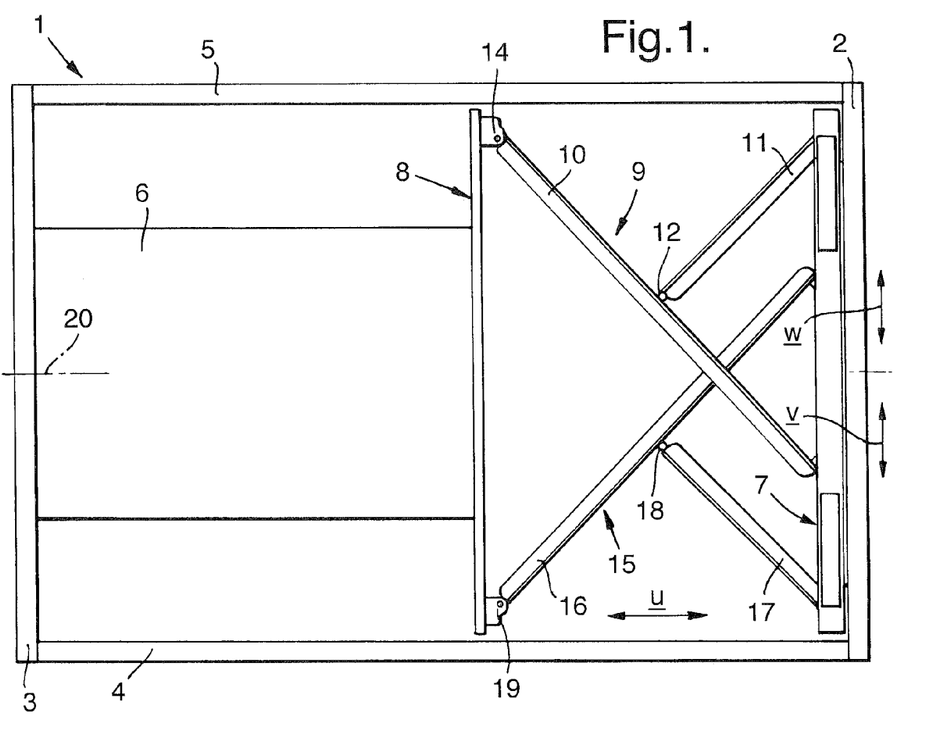
FIG. 1 is a schematic plan view onto a transport container with an installed device according to a first embodiment of the invention.

FIG. 1 shows a highly schematic view of a transport container 1, e.g. a crate or advantageously a skelton container, which has a base part supported on feet, a first face wall 2, a second face wall 3 located opposite the first face wall 2 and parallel to it, and side parts 4 and 5 connecting the two face walls 2, 3. A schematically indicated object 6, which is to be fixed against slippage for the purposes of the transport, is disposed in the transport container 1.

Figure 2:
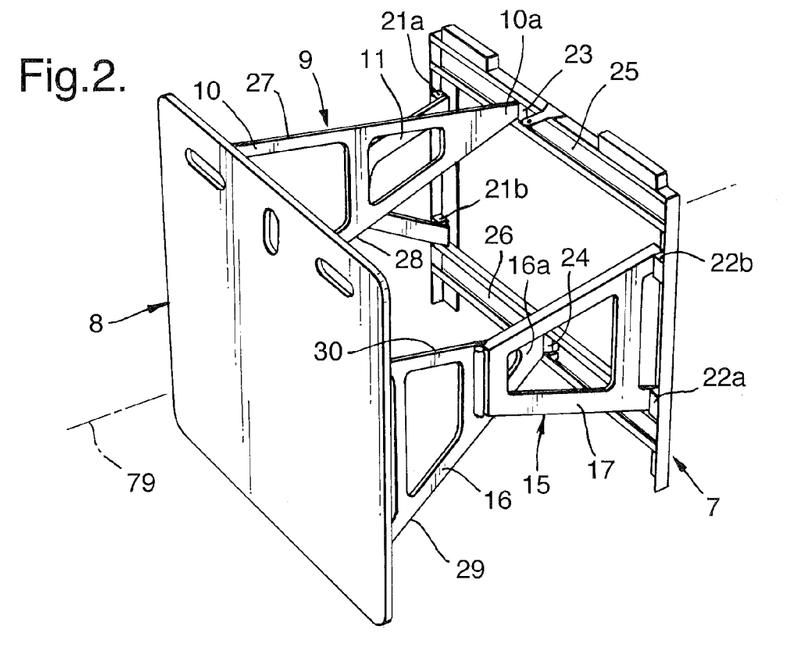
FIG. 2 is a perspective view only of the device according to FIG. 1.

For this, a device shown schematically in FIGS. 1 to 6 is provided according to the invention. This contains two panel-shaped structural parts 7 and 8, for example, which are arranged essentially parallel to one another. It is assumed in the embodiment that the structural part 7 serves as assembly element and is fastened with fastening elements (not shown) to the inside of the face wall 2. To save weight, the structural part 7 can also be configured as a rectangular frame, as shown in FIG. 2, and have a central opening for this purpose. Conversely, the other structural part 8 has the function of a holding element here, which presses the object 6 against the inside of the opposing face wall 3 and as a result fixes it against slippage in the transport container 1. Therefore, the structural part 8 is preferably a solid panel. A swivel mechanism, which is given the general reference 9 and is schematically outlined below on the basis of FIGS. 1 to 6, serves to displace the structural part 8 in relation to structural part 7 in the direction of a double arrow u. The swivel mechanism 9 is Y-shaped and has a long leg 10 and a short leg 11. The short leg 11 connected at one end by a swivel bearing 12 to a central region of the long leg 10 to allow it to swivel and at an opposite end by a further swivel bearing to the structural part 7 to swivel. In contrast, the long leg 10 is disposed to swivel at one end on the structural part 8 by means of a swivel bearing 14 and adjustably connected to the structural part 7 at its other end. "Adjustably" in this case should mean that the end section of the leg 10 can be displaced parallel to a double arrow v, i.e. perpendicular to the arrow u and perpendicular to the vertical along the length of structural part 7.

To improve stability and torsional rigidity, a second likewise Y-shaped swivel mechanism 15 essentially of the same type or structure is provided, which has a long leg 16 and a short leg 17. Analogously to swivel mechanism 9, the short leg 17 is connected to a central region of the long leg 16 to swivel by a swivel bearing 18 and to the structural part 7 by a further swivel bearing, whereas the long leg 16 is connected by a swivel bearing 19 to the structural part 8 to swivel and to be displaceable or adjustable in the direction of an arrow w parallel to the arrow v. As FIG. 1 additionally shows, the two swivel mechanisms 9 and 15 are preferably arranged mirror-symmetrically to a central plane 20 of the device parallel to the arrow u. In this case the positions of the swivel bearings 14, 19 are selected so that the end sections of the long legs 10, 16 respectively come to lie on an outside of the structural part 8. Accordingly, the pivot points for the short legs 11, 17 are respectively located on an outside of the structural part 7, as FIGS. 1 to 6 show.

As FIG. 2 in particular shows, the long leg 10 is preferably triangular in shape, wherein one side of the triangle is connected to the structural part 8 to swivel, whereas a point 10a of the triangle located opposite this side of the triangle is adjustably disposed on the structural part 7. The same applies accordingly to the long leg 16 and a point 16a of the triangle thereof. The short legs 11, 17 are preferably triangular or trapezoidal, wherein two pairs of swivel bearings 21a and 21b or 22a and 22b with respectively coaxial swivel axes for the legs 11 or 17 respectively are shown in FIG. 2. Moreover, FIG. 2 shows that, in a particularly advantageous manner, the long and short legs are respectively configured in the shape of a frame, i.e. are provided with central openings to save weight. The adjustable mounting of the long legs 10, 16 on the structural part 7 is achieved, for example, in that on the ends of the legs 10, 16 or on the points 10a, 16a of their triangles rollers 23, 24 are respectively rotatably disposed, which can run in C-shaped guide rails 25, 26 open towards the structural part 8, from which rails cross-struts extend on the upper or lower edge of the frame-shaped structural part 7, these guide rails 25, 26 forming tracks for the rollers 23, 24 arranged parallel to the arrows v and w.

Moreover, it is evident from FIG. 2 that the roller 23 for the long leg 10 is disposed in the upper guide rail 25 and the roller 24 for the long leg 16 is disposed in the lower guide rail 26 of the structural part 7. The reason for this is explained further below.

Otherwise, when the device is in use mode, the two parallel structural parts 7, 8 are extended essentially vertically and perpendicular to the base of the transport container 1. The same applies to the swivel axes of the different swivel bearings 12, 14, 18, 19, 21 and 22 (cf. FIG. 2). The panels or frames forming the legs 10, 11 or 16, 17 are accordingly arranged with their central planes perpendicular to the base of the transport container. On the other hand, the guide rails 25, 26 are arranged horizontally in the use mode and parallel to the base.

Figure 3:
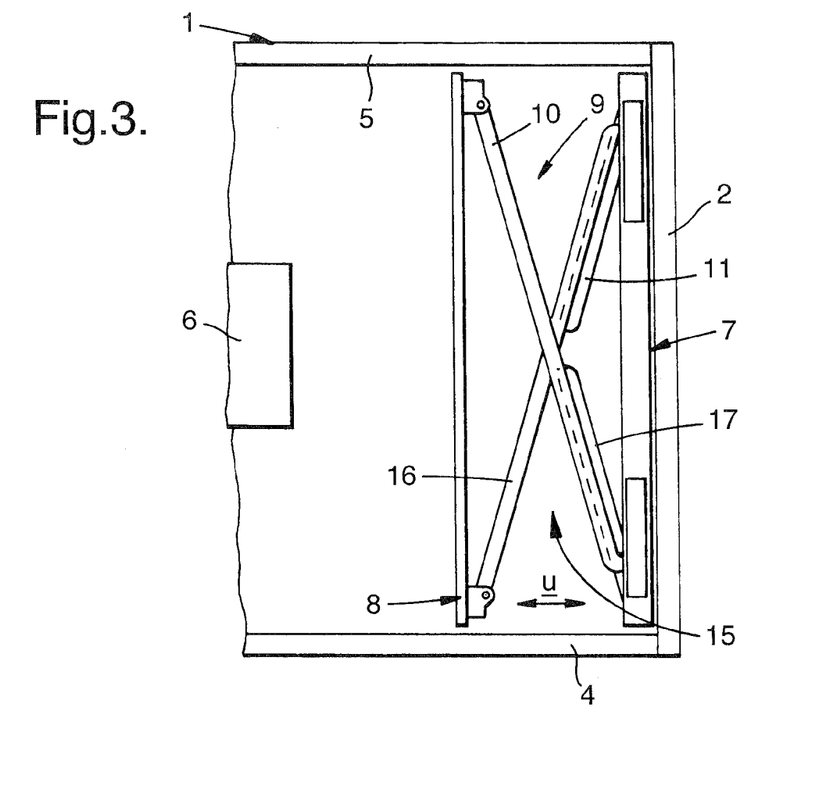
FIGS. 3 and 4 are views corresponding to FIGS. 1 and 2 showing an operating state, in which the device according to the invention is not extended as far as in FIGS. 1 and 2.
Figure 4:
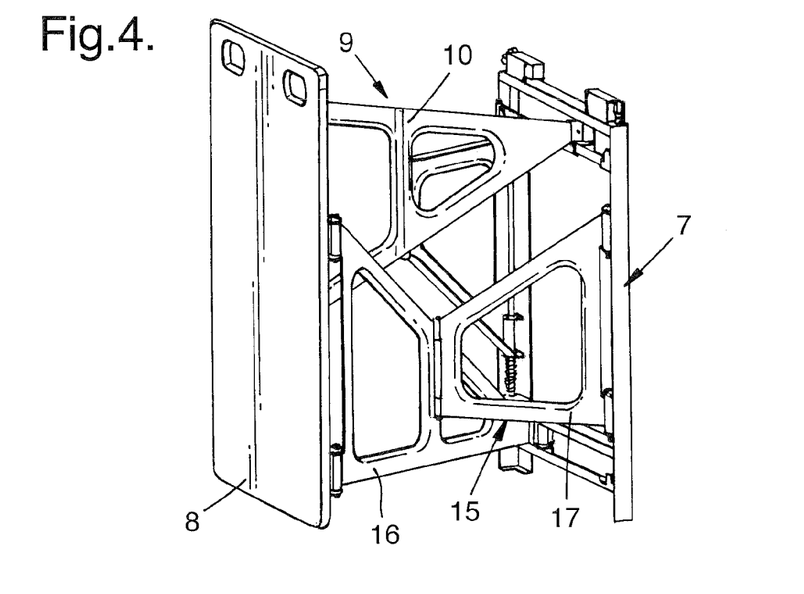
Figure 5:
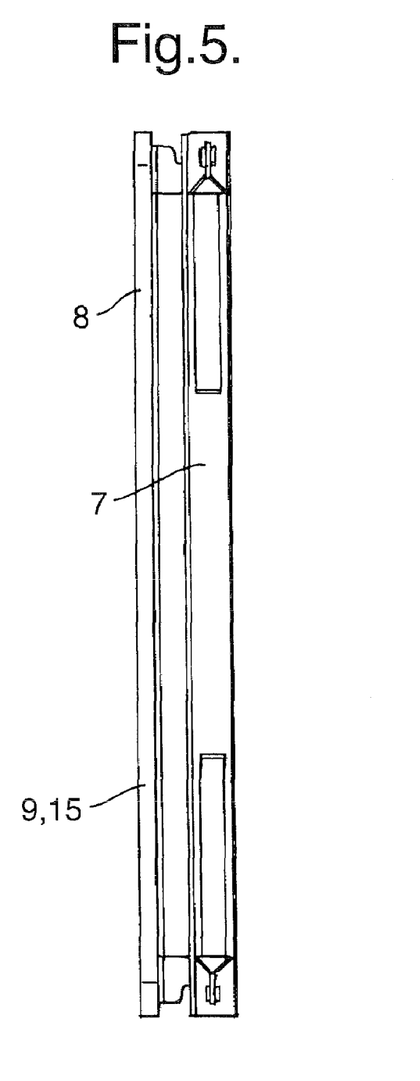
FIGS. 5 and 6 are views corresponding to FIGS. 3 and 4 showing the device according to the invention in a folded-down operating state.
Figure 6:
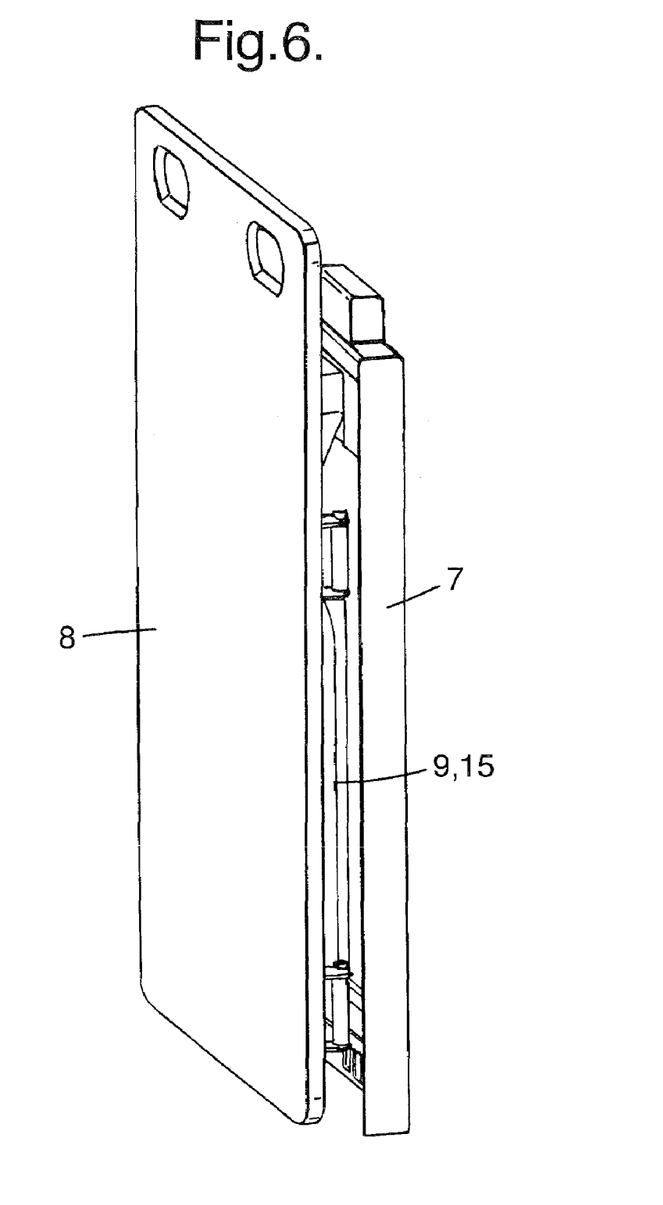

Because of the described arrangement, it is possible to move the structural part 8 parallel to the arrow u or parallel to the central plane 20, as FIGS. 3 and 4 show, in which case the ends of the long legs 10, 16 or their rollers 23, 24 are displaced or shifted parallel to the arrows v or w. If the distance between the structural parts 7 and 8 is reduced as a result of this, as a comparison of FIGS. 1, 2 and FIGS. 3, 4 shows, then the adjustable ends of the legs 10 and 16 originally arranged close to the central plane 20 (FIG. 1), for example, move further away from this (FIG. 3), whereas the distance between the structural parts 7, 8 increases upon reverse movement of the rollers 23, 24.

Upon further displacement of the rollers 23, 24 outwards or away from the central plane 20, a position is finally reached (FIGS. 5, 6), in which the structural parts 7, 8 are at the shortest possible distance from one another. This distance is determined by the dimensions of the parts of the swivel mechanisms 9, 15 located between the structural parts 7, 8.

The mounting of the rollers 23, 24 in an upper and a lower guide rail 25 or 26 and the triangular configuration of the long legs 10 and 16 enable the provision of as short a distance as possible. As shown in FIG. 2 in particular, an upper edge 27 of the leg 10 between the point 10a of the triangle, or the roller 23 disposed in the upper guide rail 25, and the opposite structural part 8 is extended essentially horizontally, whereas a lower edge 28 of the leg 10 is extended from the point 10a of the triangle inclined downwards until close to the lower edge of the structural part 8. Conversely, in the case of the long leg 16, a lower edge 29, extending from the roller 24 disposed at the bottom, is extended essentially horizontally as far as the structural part 8. whereas an upper edge 30 of the leg 16 is extended from the point 16a of the triangle inclined upwards until close to the upper edge of the structural part 8. Therefore, the two swivel mechanisms 9 and 15 are swung increasingly intensively reducing the distance between the two structural parts 7, 8, as the transition from FIGS. 3, 4 to FIGS. 5, 6 shows, then the lower edges 28 of the leg 10 and the upper edge 30 of the leg 16 increasingly assume the position of a diagonal to the structural part 7, as is indicated schematically in FIG. 7. In this case, the arrangement is preferably selected so that the two edges 28, 30 stand opposite one another with a small distance between them, and therefore the two legs 10, 16 are arranged relative to one another so that they can be folded closely onto the structural parts 7, 8 until they are arranged practically parallel between these. Moreover, the arrangement is expediently such that as they approach the structural parts 7 and 8, the two short legs 11, 17 are swung increasingly more intensively around the swivel bearings 12,18 until they also lie essentially parallel to the structural parts 7 and 8 and therefore between these and the associated long legs 10, 16. This state is shown in particular in FIGS. 5, 6 and 7.

As a result of the described design, the distance between the structural parts 7, 8, in the completely folded down state, virtually corresponds to the sum of the thicknesses of the structural parts 7, 8, on the one hand, and the sum of the thicknesses of the legs 10, 11 or 16, 17, on the other. Therefore, in this state, the device according to the invention only slightly reduces the space that may be filled inside the transport container 1. Nevertheless, the sides of the triangles of the long legs 10 and 16 disposed to swivel, given the references 10b and 16b in FIG. 7, can extend over a large portion of their height and more than half the height of the structural part 8 and, as shown in FIG. 2, the same applies to the height of those parts of the short legs 11 and 17, which are articulated onto the structural part 7. As a result, a particularly high stability and torsional rigidity of the device is achieved, while only requiring a small amount of space when folded down.

Figure 8:
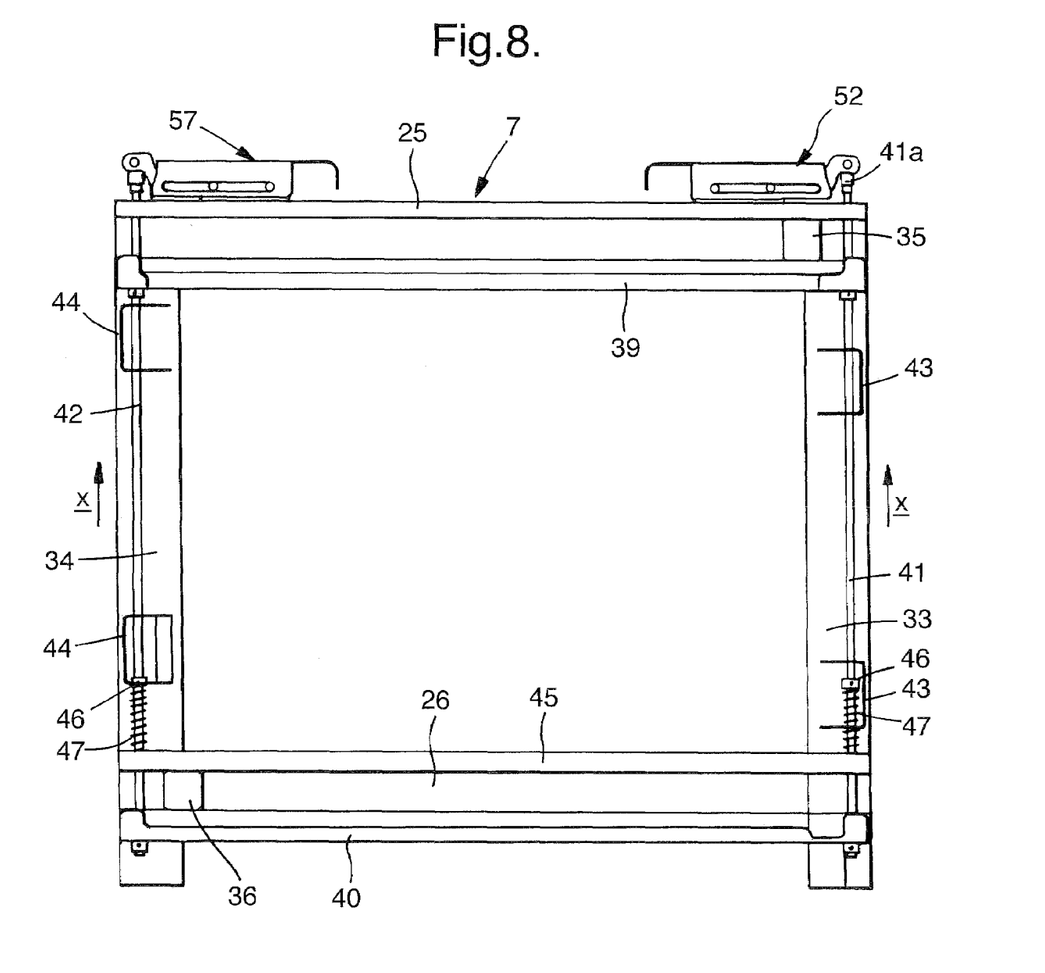
FIG. 8 is a schematic rear view of a structural part serving as assembly element in association with a locking means, wherein all other structural elements have been omitted.
Figure 9:
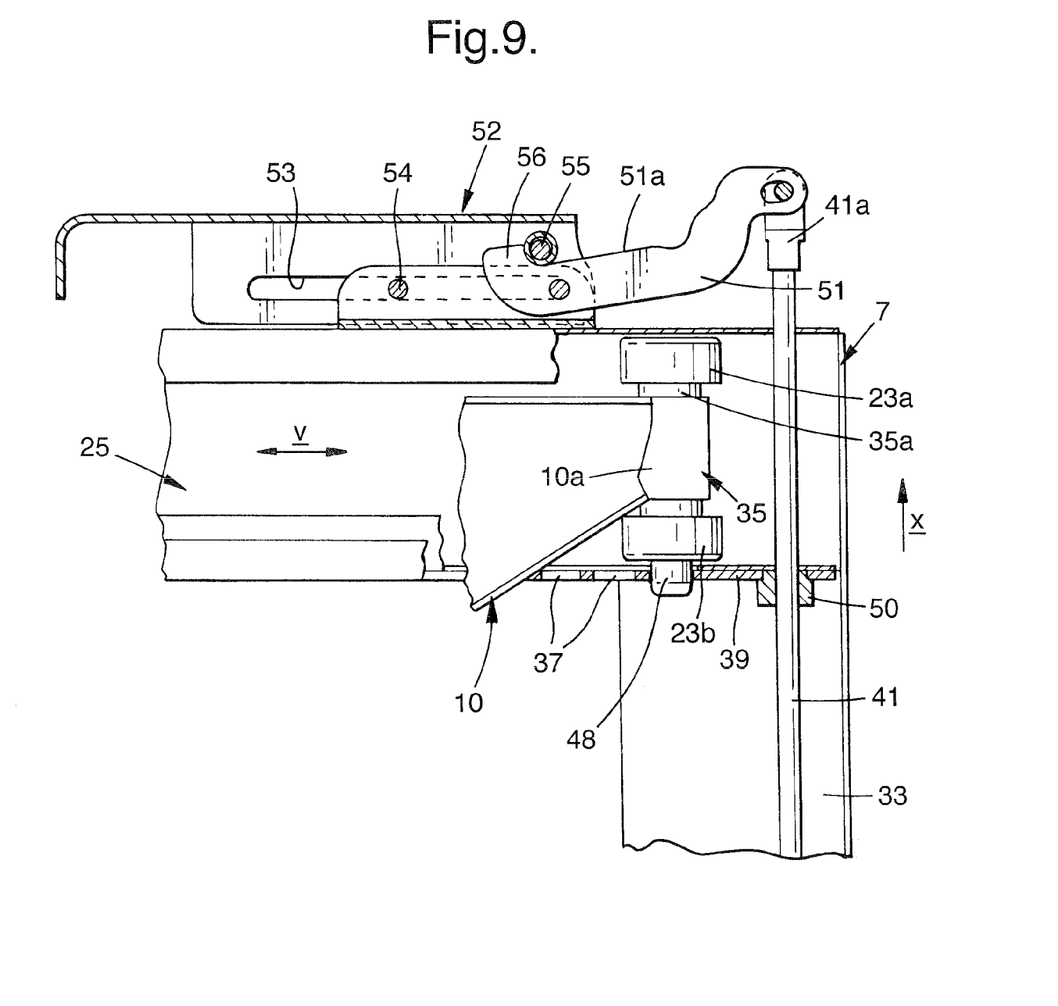
FIGS. 9 and 10 shows an enlarged detail X of FIG. 7 in two different operating positions.
Figure 10:
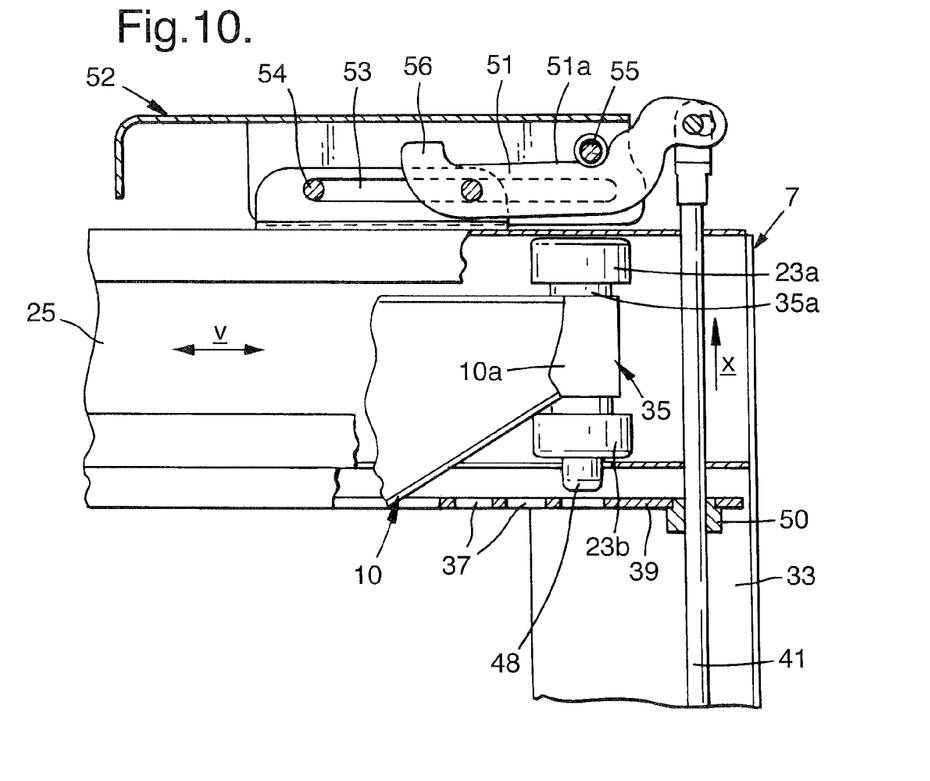

FIG. 8 schematically shows a rear view of the structural part 7 used as assembly element without the swivel mechanisms 9, 15 and without the structural part 8, but with a means for locking the structural parts 7, 8 in the relative positions that may be created by means of the swivel mechanisms 9, 15. Details of the locking means are shown in FIGS. 9 and 10 in two different operating positions. According to this, the structural part 7 contains an upper and a lower frame part formed by the guide rails 25, 26 and two side parts 33 and 34, which are vertical in the operating position, connecting these. A runner 35 provided with the roller 23 is displaceably disposed in the upper guide rail 25 and a runner 36 provided with the roller 24 is displaceably disposed in the lower guide rail 26. As FIGS. 9 and 10 in particular show in a partially broken-open view, the roller 23 is configured in two parts and is provided with an upper and a lower roller part 23a, 23b, between which an axis means 35a of the runner 35 is disposed, which serves to fasten the point 10a of the triangle of the long leg 10 so that it can swivel. The arrangement in the region of the runner 36, to which the point 16a of the triangle of the long leg 16 is fastened, is configured in a corresponding manner.

Below the guide rails 25, 26 a respective strip 39 or 40 provided with holes 37, 38 (cf. also FIG. 7) is arranged, the lateral ends thereof being fastened to a respective operating rod 41 or 42. The operating rods 41, 42 are displaceably disposed, for example, in the passages of mountings 43, 44 and also of a holding rail 45 mounted above the lower guide rail 26, wherein the mountings 43, 44 and the holding rail 45 are fastened to the rear sides of the frame parts 33, 34 and permit a movement of the operating rods 41, 42 parallel to them, e.g. a vertical movement in the operating position. Pressure springs 47 (FIG. 8) are tensioned onto the operating rods 41, 42 between radial projections 46 attached to the operating rods 41, 42 and the holding rail 45. As a result, the operating rods 41, 42 are prestressed vertically upwards in the direction of arrows x in FIG. 8 and press the strips 39, 40 from below against the guide rails 25 or 26. As a result of pressure on the operating rods 41, 42 in a direction opposed to the arrows x, the strips 39, 40 can be pressed downwards against the action of the springs 47 and lifted from the guide rails 25, 26.

FIGS. 9 and 10 show details of the locking means by the example of the point 10a of the triangle and the roller 23 of the long leg 10 fastened thereto according to FIG. 2, wherein a locking position is shown in FIG. 9 and an unlocking position is shown in FIG. 10. This shows that the adjustable long leg 10 can be displaced with its point 10a of the triangle at the end or its roller 23 not only in the direction of the double arrow v in the guide rail 25 (cf. also FIG. 1), but that a latch pin 48 is also attached to the lower side of the point 10a of the triangle or the roller 23. The purpose of this latch pin 48 is to latch into one of the holes 37 of the strip 39 and thus fix the position of the end section of the long leg 10 on the structural part 7 in the direction of the arrow v. This latched position is secured by the spring 47 (FIG. 9).

If the leg 10 or its roller 23 is to be displaced to create a different distance between the two structural parts 7, 8, the operating rod 41 is displaced downwards against the force of the spring 47 into the position evident from FIG. 10. In so doing, the operating rod 41 fastened to the strip 39 at entrains the strip 39 at its right end in FIG. 8 against the direction of the arrow x until the latch pin 48 exits from the respective hole 37. The leg 10 can then be shifted parallel to the arrow v with the operating rod 41 pushed down until a new desired relative position of the two structural parts 7, 8 is created. Following this, the operating rod 41 is released and as a result is pressed upwards under the action of the spring 47 in the direction of the arrow x, in which case the latch pin 48 can latch into a hole 37 of the strip 39 again.

The lower strip 40 (FIGS. 7 and 8) is operated on its right side by the operating rod 41 in a corresponding manner. Moreover, the operating rod 42 serves the purpose of operating the strips 39, 40 at their left ends in FIG. 8 in the same manner as has been described above for the right ends. In this case, the operating rods 41, 42 can be operated selectively jointly or singly and independently of one another. In the embodiment analogous to FIGS. 9 and 10, for example, when pressing down the operating rod 42 alone only the roller 24 or the runner 36 (FIG. 8) are preferably released, for which purpose the strip 40 is disposed to swivel in such a way that the runner 35 remains locked in the manner evident from FIG. 9.

For operation of the operating rod 41, this projects upwards with a headpiece 41a beyond the upper guide rail 25. There the headpiece 41a is connected to swivel to one end of a lever 51, to which is assigned a slide 52 that is intended for its operation and displaceably disposed on the guide rail 25. The slide 52 is provided with an elongated hole 53, which has guide pins 54 projecting through it, which are mounted on the upper side of the guide rail 25 in such a way that the slide 52 can be moved back and forth in the direction of the arrow v to a dimension determined by the length of the elongated hole 53.

In addition, the slide 52 has a control pin 55 fastened to it, which engages behind a locking hook 56 of the lever 51 arranged essentially perpendicular to the operating rod 41 and abuts against this in a locking position according to FIG. 9 so that the articulated operating rod 41 can assume its highest position, i.e. the locking position, and at the same time an upper edge 51a of the lever 51 according to FIG. 9 is arranged on a slight inclination to the surface of the guide rail 25. If the unlocking position is to be created from this position, the slide 52 in FIG. 9 is moved to the right, as a result of which the control pin 55 runs onto the inclined upper edge 51a of the lever 51 and as a result gradually presses this down until it has reached the unlocking position evident from FIG. 10. In this position the operating rod 41 and the right end of the strip 39 are pressed down so far that the latch pin 48 exits from the strip 39. If the locking position is subsequently to be created again, the runner 52 is displaced in the opposite direction (FIG. 9).

Figure 7:
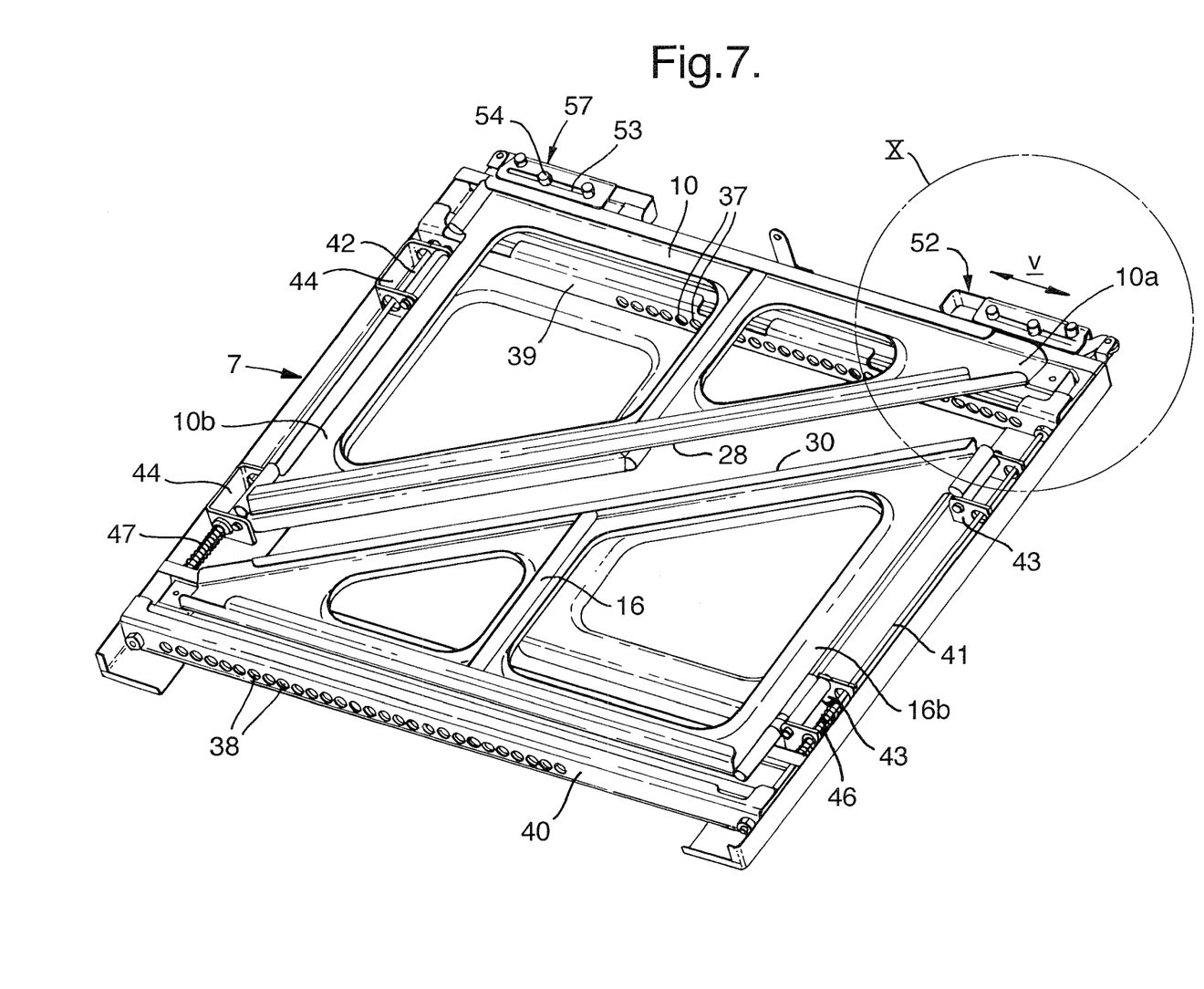
FIG. 7 is a perspective rear view of a structural part of the device of FIGS. 1 to 6 serving as assembly element, wherein a structural part serving as holding element has been omitted.

It is further evident from FIGS. 7 and 8 that corresponding slides 52 and 57 arranged and configured mirror-symmetrically and levers 51 associated with these are provided for both operating rods 41, 42.

The invention has the advantage that a device, which enables secure fixture of the objects 6 in the transport container 1, is made with simple means. If this concerns objects 6, where displacement of the entire structural part 8 parallel to the arrow u (FIG. 1) is sufficient for their fixture, the slides 52 and 57 described on the basis of FIGS. 7 to 10 are simultaneously displaced into the unlocking position, as a result of which the two strips 39, 40 are lifted to their entire length from the guide rails 25, 26 and the latch pins 48 of both rollers 23, 24 are released as a result. After the desired displacement, the slides 52, 57 are moved back into their locking position.

Figure 11:
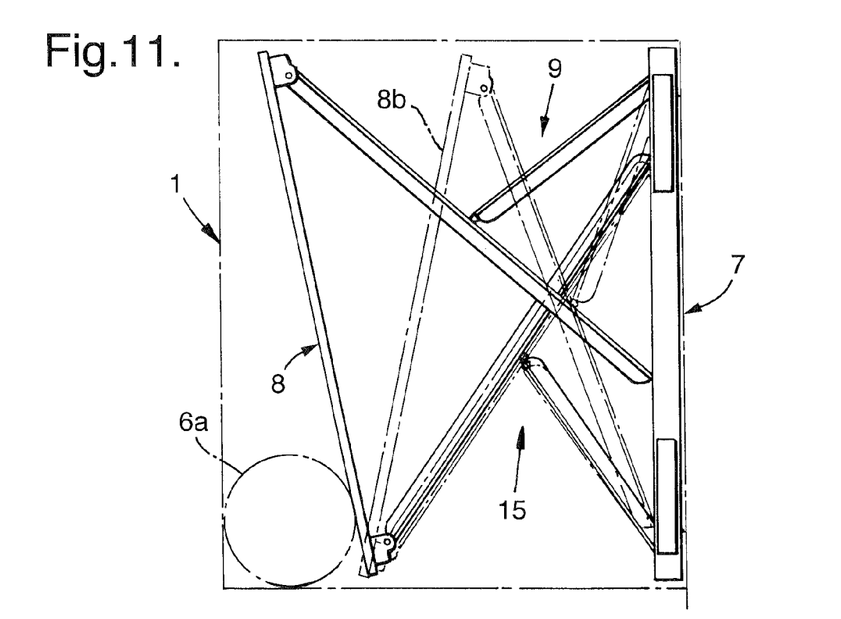
FIG. 11 is a schematic plan view corresponding to FIG. 1, but with a structural part of the device configured as holding element arranged on an incline.

However, if the object concerned is an object such as a barrel, cask or suchlike, for example, with such a cross-section that it cannot be sufficiently securely held in position by the two structural parts 7 and 8 so long as they assume a parallel position, then in a particularly advantageous manner the device according to the invention also provides the possibility of bringing the structural part 8 into an inclined position in relation to the other structural part 7 by bringing only one of the two slides 52, 57 into the unlocking position. As a result of this operation, the two strips 39, 40 are only lifted from the guide rails 25, 26 on one side, i.e. in FIG. 8 on the right or left, for example. As a result, only those latch pins 48 arranged just on this side of the structural part 7 are released. If the arrangement according to FIGS. 2, 3 and 8 is such that the single roller 23 of one long leg 10, for example, is arranged in the upper guide rail 25 and the single roller 25 of the other long leg 16 is arranged in the lower guide rail 26 beyond a larger portion of the adjustment path substantially on one side or the other of the guide rails 25, 26, then in this way roller 23 or runner 35, for example, can be fixed and roller 24 or runner 36 can be released, or vice versa. With an appropriate selection of the lever conditions, which may be seen in particular from FIG. 1, and with adequate tolerances given, the structural part 8 can then be swivelled in one direction or the other in relation to the structural part 7, as shown in FIG. 11 by the example of a position 8a (marked by a solid line) that may be created when roller 24 is released and a position 8b (marked by a broken line) that may be created when roller 23 is released. Moreover, this enables an object 6a to be arranged, for example, in a corner of the transport container 1 and thus be simultaneously positioned, as indicated schematically in FIG. 11.

Figure 12:
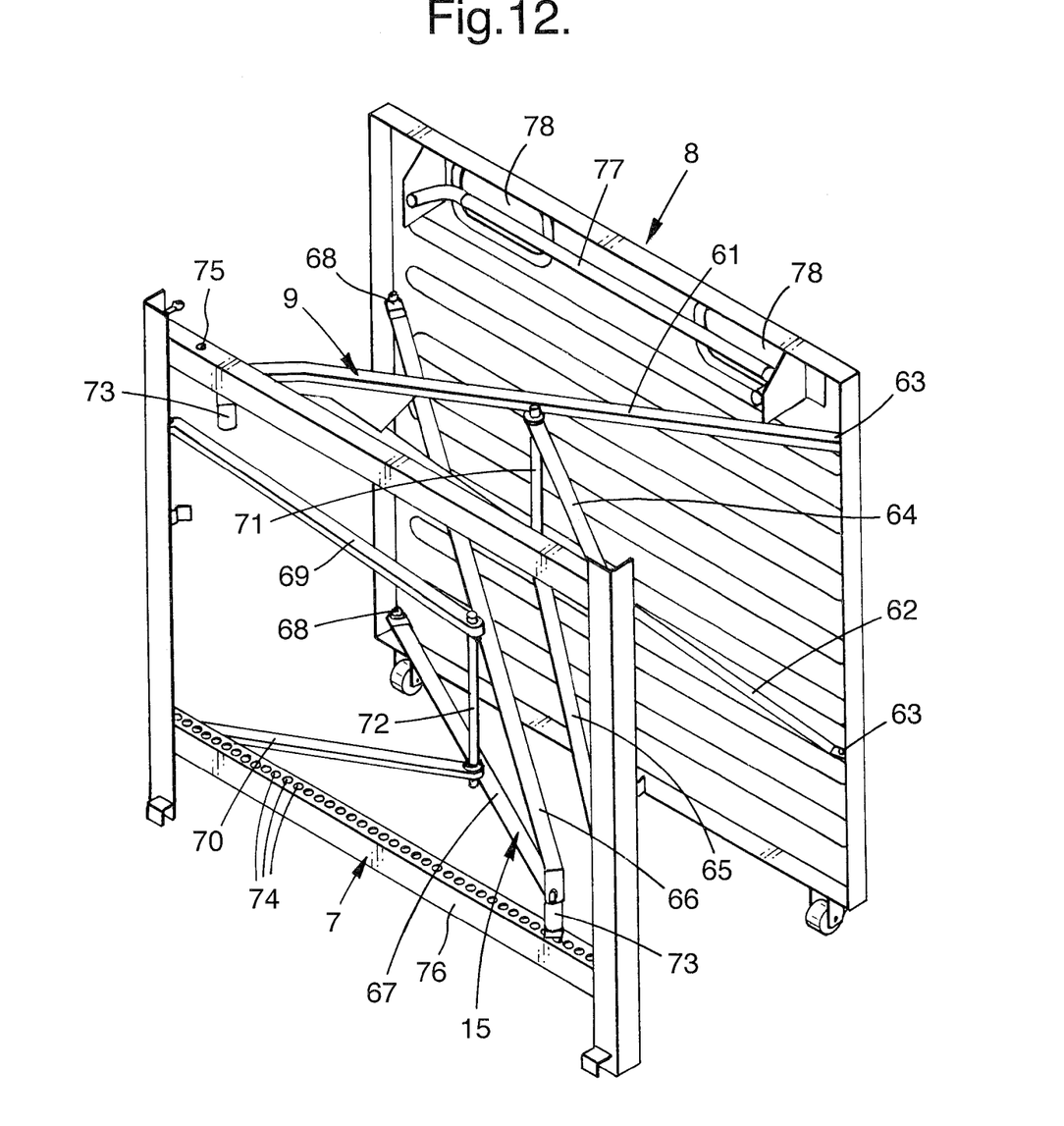
FIG. 12 is a perspective view of a second embodiment of the device according to the invention.
Figure 13:
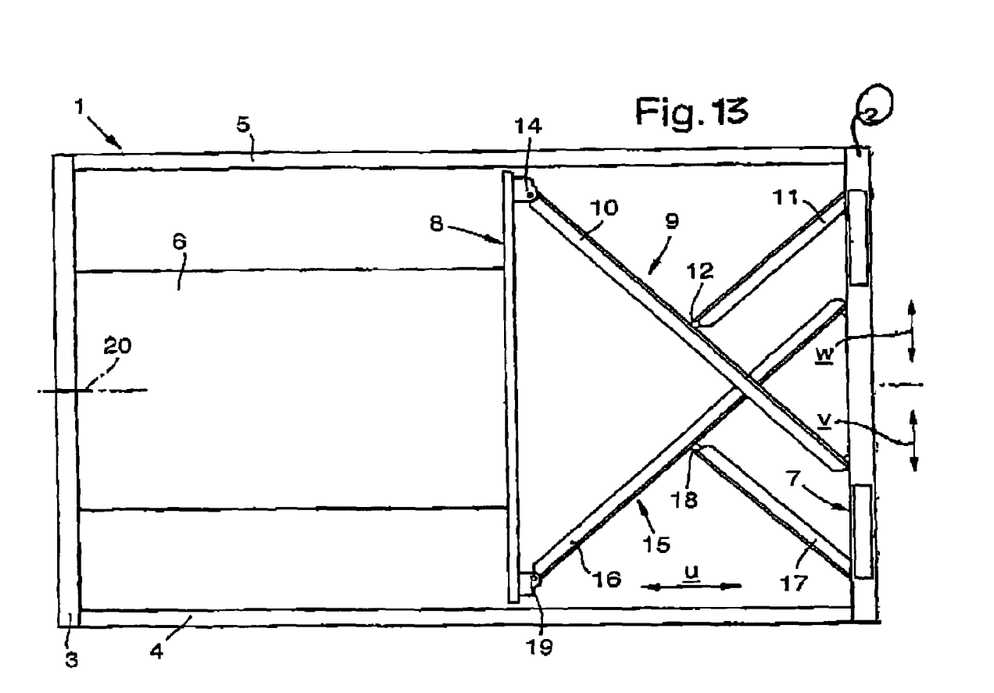
FIG. 13 is a perspective view of the device, showing an embodiment in which the wall is both a wall of the container and structural part 7.

While FIGS. 1 to 11 show an embodiment of the invention currently considered the best, a second embodiment is shown in FIG. 12. Identical parts are provided therein with the same reference numerals as in FIGS. 1 to 11. In contrast to FIGS. 1 to 11, the first swivel mechanism 9 contains a long leg comprising two rods 61 and 62, which are arranged in a V shape and firmly connected to one another in the point of the V shape and at their end remote from the point are fastened to swivel on the structural part 8 by means of swivel bearings 63, and also contains a short leg comprising two essentially parallel rods 64, 65, which are fastened to swivel at one of their ends on the same side of the structural part 7 located opposite the swivel bearings 63. The second swivel mechanism 15 accordingly contains a long leg comprising rods 66, 67, which are arranged in a V shape and connected to one another in their point and their ends remote from the point are fastened with swivel bearings 68 on the side of the structural part 8 remote from the swivel bearings 63, and also contains a short leg, which consists of essentially parallel rods 69, 70 and is fastened at one end to swivel on the structural part 7. Moreover, at their respective other ends, the short legs are fastened to swivel by means of a respective swivel axis 71, 72 on a central region of the long legs or the rods 61, 62 and 66, 67. Therefore, in contrast to FIGS. 1 to 11, although the wall parts arranged between the rods 61, 62 etc. are omitted in the long and short legs, which results in a particularly lightweight design, the swivel mechanisms 9, 10 formed by the long and short legs in this embodiment still also have the Y shape in plan view characteristic of the invention.

The ends of the long legs ending in the point and serving for adjustment corresponding to the points 10a, 16a of the triangles of FIG. 4 are provided with press-in bushings 73 here, in which axially movable latch pins (not shown) are disposed. In an axially extended locking position, these latch pins project into a selected hole 74 of an upper or lower frame part 75, 76 of the structural part 7 configured as a holed strip, in a manner similar to the latch pins 48 according to FIG. 9. For unlocking, the latch pins are pulled out of the respective hole 74. Serving this purpose are Bowden cables (not shown), which are connected, on one side, to the press-in bushings 73 and the latch pins and, on the other side, to an operating lever 77, which is prestressed into a locking position by springs (not shown). This operating lever 77 can be disposed to swivel on the structural part 7 like the slides 52, 57 according to FIG. 8. However, an advantageous embodiment (FIG. 12) provides that the operating lever 77 is disposed in an upper region of the displaceable structural part 8 and at the same time is provided with gripping holes 78, as FIG. 12 clearly shows. When a change in position is desired, the structural part 8 can thus be grasped by the gripping holes 78 and at the same time the latch pins can be pulled out of the holes 74 by means of the operating lever 77. After the position change has been achieved, the operating lever 77 is released, as a result of which the locking position is automatically created again. Furthermore, in the embodiment according to FIG. 12 rollers (not shown) running in the guide rails can also be provided in order to facilitate the displacement of the points of the triangles of the legs 61, 62 or 66, 67 carrying the press-in bushings 73.

The invention is not restricted to the described embodiments, which can be modified in a variety of ways. For example, it is possible to provide the locking means with different, in particular electric, electromagnetic, hydraulic, pneumatic or other, means suitable for releasing the latch pins 48 from the holes 38 or 74, which can also have rotatable spindles. Moreover, instead of the only stepwise adjusting ability of the long legs as a result of the holes 38, 74, it can be advantageous to provide a continuous adjusting ability by fixing the long legs in position with clamping elements, for example. In this case, the adjustment path can be selected differently depending on requirement and, in contrast to FIGS. 1 to 6, can also extend over the entire width of the assembly element. Moreover, both the swivel bearings 12, 14, 18, 19 etc. acting as fixed bearings and the combinations of rollers 23, 24 and latch pins 48 or similar acting as loose bearings can have different configurations to those shown. In this case, the arrangement can differ from the mirror-symmetric arrangement of the short legs 11, 17 to the central plane on the outsides of the long legs 10, 16 evident from FIG. 1. As described, it must only be assured that the structural parts 7, 8 are displaceable essentially parallel to the arrow u without any displacement parallel to the arrows v and w occurring that is no longer tolerable in the case of displacement of the structural part 8. This can be achieved by appropriate dimensioning of the swivel mechanisms.

It is additionally clear that the described device can be arranged in the transport container in a different manner to that shown. For example, the structural part 7 serving as assembly element can be arranged on a long side 4, 5 (FIG. 1) of the transport container, in which case preferably at least the structural part 8 serving as holding element should have a width corresponding to the length of the long side. In addition, the described devices can also be inserted into the transport container 1 in a position rotated 90° around a longitudinal axis 79 (FIG. 2), in which case the different swivel axes are arranged essentially horizontally and the elements serving to operate the locking means come to lie on the side portion 33 or 34 then located at the top (FIG. 8). In addition, it would be possible to use structural part 7 as holding element and structural part 8 as assembly element and/or to support the respectively movable structural part on rollers or wheels for easier mobility. Apart from this, the invention also includes transport containers, in which the described device is fixedly installed. It can be expedient in this case to completely omit the structural part 7 serving as assembly element and replace it by a correspondingly configured solid wall or the base of the respective transport container. This applies in particular to a further possible application of the device according to the invention, wherein structural part 7 is arranged on the base of the transport container 1 and structural part 8 serves to be displaced perpendicularly upwards to a greater or lesser extent. In this case, objects to be stored in a crate or suchlike can be positioned at different heights in accordance with requirement. This is frequently desirable particularly with a single-layered arrangement of objects, since a smaller installation height that is to be preferred for ergonomic reasons is achieved in this way. In this case, the device according to the invention serves as a displaceable base, and therefore the structural part 8 should have a size corresponding to the size of the base area here.

In place of two swivel mechanisms in each case, a single swivel mechanism can also be sufficient. Moreover, three or more swivel mechanisms can also be provided, which can all be configured the same or have different configurations. In all cases, the legs 10, 11 or 16, 17 can additionally be simple rods or tubes or have different forms to those described, wherein in particular the swivel bearings 12, 18 can lie at any expedient location. Finally, it should be understood that the different features can also be applied in combinations other than those shown and described.

It will be understood, that each of the elements described above or two or more together, may also find a useful application in other types of construction differing from the types described above.

While the invention has been illustrated and described as embodied in a crate, particularly a skeleton container, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. Device for fixing, positioning, or both fixing and positioning objects (6) in a transport container (1), comprising: a first and a second structural part (7, 8), wherein one of said structural parts (7) is configured as an assembly element to be fastened on said transport container (1) and the other of said structural parts (8) is configured as a holding element intended for abutment against said objects (6); at least one swivel mechanism (9, 15) connecting said two structural parts (8) and having two legs pivotally connected to one another, one leg being adjustably disposed on one of said two structural parts (7, 8) for making possible selected positions of said two structural parts (7, 8) relative to one another; and a means for locking said structural parts (7, 8) in said possible relative positions, wherein said swivel mechanism (9, 15) is Y-shaped, wherein one of said two legs is a long leg (10, 16 or 61, 62; 66, 67) connected to both said structural parts (7, 8) and the other of said two legs is a short leg (11, 17 or 64, 65; 69, 70) connected to one of said structural parts (7, 8) and a central region of said long leg (10, 16 or 61, 62; 66, 67), wherein said long leg (10, 16 or 61, 62; 66, 67) is swivellably connected to the other of said structural parts (8) and is adjustably mounted on said one structural part (7).

2. Device according to claim 1 and further containing at least two of said Y-shaped swivel mechanisms (9, 15), each having a long and a short leg.

3. Device for fixing, positioning, or both fixing and positioning objects (6) in a transport container (1), comprising: a first and a second structural part (7, 8), wherein one of said structural parts (7) is configured as an assembly element to be fastened on said transport container (1) and the other of said structural parts (8) is configured as a holding element intended for abutment against said objects (6); at least one swivel mechanism (9, 15) connecting said two structural parts (8) and having two legs pivotally connected to one another, one leg being adjustably disposed on one of said two structural parts (7, 8) for making possible selected positions of said two structural parts (7, 8) relative to one another; and a means for locking said structural parts (7, 8) in said possible relative positions, wherein said swivel mechanism (9, 15) is Y-shaped, wherein one of said two legs is a long leg (10, 16 or 61, 62; 66, 67) connected to both said structural parts (7, 8) and the other of said two legs is a short leg (11,17 or 64, 65; 69, 70) connected to one of said structural parts (7, 8) and a central region of said long leg (10, 16 or 61, 62; 66, 67), wherein said long leg (10, 16 or 61, 62; 66, 67) is swivellably connected to the other of said structural parts (8) and is adjustably mounted on said one structural part (7), wherein at least two of said Y-shaped swivel mechanisms (9, 15) each have a long and a short leg, wherein a configuration and arrangement of said two long legs (10, 16 or 61, 62; 66, 67) are such that said long legs lie one above each other in a folded-in state.

4. Device according to claim 3 wherein said long legs (10, 16 or 61, 62; 66, 67) are in the form of a triangle, wherein a respective side of said triangle is connected to the other of said structural parts (8) and wherein a point (10a, 10b) of said triangle lying opposite said side of said triangle is adjustably disposed on said one of said two structural parts (7).

5. Device according to claim 4, wherein said sides of said triangle of said long legs (10, 16 or 61, 62; 66, 67) connected to the other of said structural parts (8) extend over more than half a height or width of said other structural part (8).

6. Device according to claim 3, wherein said long and short legs (10, 16; 11, 17) are configured in the shape of a frame.

7. Device according to claim 3, wherein said one structural part (7), on which said long leg (10, 16 or 61, 62; 66, 67) is adjustably disposed, is said assembly element.

8. Device according to claim 3, wherein said locking means contains a strip (39, 40; 75, 76) provided with holes (37, 38; 74), said strip being provided on said one structural part (7), on which said long leg (10, 16 or 61, 62; 66, 67) is adjustably disposed, and wherein on an adjustably disposed end said long leg (10, 16 or 61, 62; 66, 67) has a latch pin (48), which can latch into said holes (37, 38; 74).

9. Transport container being provided with a device according to claim 3.

10. Transport container according to claim 9 and having at least one wall, wherein said one structural part (7) is configured as an assembly element and is attached firmly but detachably to said one wall.

11. Transport container according to claim 10, wherein said one structural part (7) serving as the assembly element is configured as a wall or base of said transport container (1).

12. Device for fixing, positioning, or both fixing and positioning objects (6) in a transport container (1), comprising: a first and a second structural part (7, 8), wherein one of said structural parts (7) is configured as an assembly element to be fastened on said transport container (1) and the other of said structural parts (8) is configured as a holding element intended for abutment against said objects (6); at least one swivel mechanism (9, 15) connecting said two structural parts (8) and having two legs pivotally connected to one another, one leg being adjustably disposed on one of said two structural parts (7, 8) for making possible selected positions of said two structural parts (7, 8) relative to one another; and a means for locking said structural parts (7, 8) in said possible relative positions, wherein said swivel mechanism (9, 15) is Y-shaped, wherein one of said two legs is a long leg (10, 16 or 61, 62; 66, 67) connected to both said structural parts (7, 8) and the other of said two legs is a short leg (11, 17 or 64, 65; 69, 70) connected to one of said structural parts (7, 8) and a central region of said long leg (10, 16 or 61, 62; 66, 67), wherein said long leg (10, 16 or 61, 62; 66, 67) is swivellably connected to the other of said structural parts (8) and is adjustably mounted on said one structural part (7), wherein said long leg (10, 16 or 61, 62; 66, 67) is swivellably connected to the other of said structural parts (8) and is adjustably mounted on said one structural part (7), wherein at least two of said Y-shaped swivel mechanisms (9, 15) each have a long and a short leg, wherein means for locking contains two strips (39, 40; 75, 76) being provided with holes (37, 38; 74) and being provided on opposing sides of said one structural part (7), on which said one respective long legs (10, 16 or 61, 62; 66, 67) of said two swivel mechanisms (9, 15) are adjustably disposed, and wherein on adjustably disposed ends said long legs (10, 16 or 61, 62; 66, 67) each have a latch pin (48), which can latch into said holes (37, 38; 74).

13. Device according to claim 12, wherein said strip (39, 40; 75, 76) is displaceably attached against a force of a spring (47) for unlocking one of said latch pins (48).

14. Device according to claim 13, wherein said strip (39, 40) has at least one associated operating rod (41, 42) intended for its displacement.

15. Device according to claim 14, wherein said operating rod (41, 42) is articulated to a lever (51), which is arranged transversely to said operating rod and swivellably connected to said other structural part (7), and wherein said lever (51) has an associated slide (52, 57), which is displaceably disposed on said structural part (7) and is intended for operation of said lever (51).

16. Device according to claim 13, wherein said strip (39, 40) has two associated operating rods (41, 42) each acting on one of its ends.

17. Device according to claim 16, wherein said operating rods (41, 42) are operable independently of one another.

18. Device according to claim 12, wherein said two strips (39, 40) are operable with a same operating rod (41, 42) or same operating rods (41, 42).

19. Device for fixing, positioning, or both fixing and positioning objects (6) in a transport container (1), comprising: a first and a second structural part (7, 8), wherein one of said structural parts (7) is configured as an assembly element to be fastened on said transport container (1) and the other of said structural parts (8) is configured as a holding element intended for abutment against said objects (6); at least one swivel mechanism (9, 15) connecting said two structural parts (8) and having two legs pivotally connected to one another, one leg being adjustably disposed on one of said two structural parts (7, 8) for making possible selected positions of said two structural parts (7, 8) relative to one another; and a means for locking said structural parts (7, 8) in said possible relative positions, wherein said swivel mechanism (9, 15) is Y-shaped, wherein one of said two legs is a long leg (10, 16 or 61, 62; 66, 67) connected to both said structural parts (7, 8) and the other of said two legs is a short leg (11, 17 or 64, 65; 69, 70) connected to one of said structural parts (7,8) and a central region of said long leg (10, 16 or 61, 62; 66, 67), wherein said long leg (10, 16 or 61, 62; 66, 67) is swivellably connected to the other of said structural parts (8) and is adjustably mounted on said one structural part (7), wherein said locking means have at least one spindle for making possible selected positions of said two structural parts (7, 8), said spindle being effective by self-locking.

\* \* \* \* \*